No. 619,605. Patented Feb. 14, 1899.
C. G. OVERMYER.
BALING PRESS.
(Application filed Dec. 21, 1897.)
(No Model.) 3 Sheets—Sheet 1.
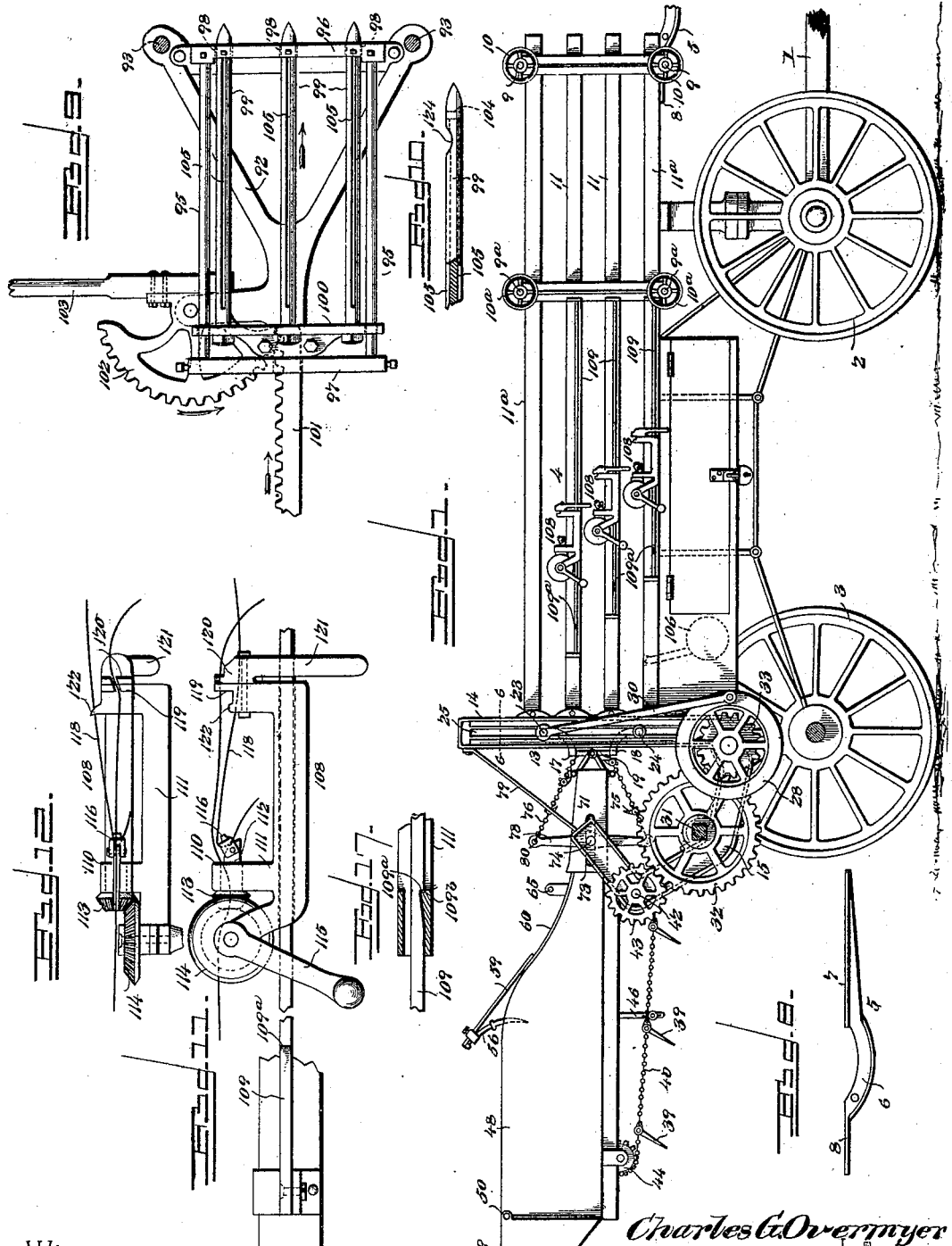
Charles G. Overmyer
Inventor No. 619,605. Patented Feb. 14, 1899.
C. G. OVERMYER.
BALING PRESS.
(Application filed Dec. 21, 1897.)
(No Model.) 3 Sheets—Sheet 2.
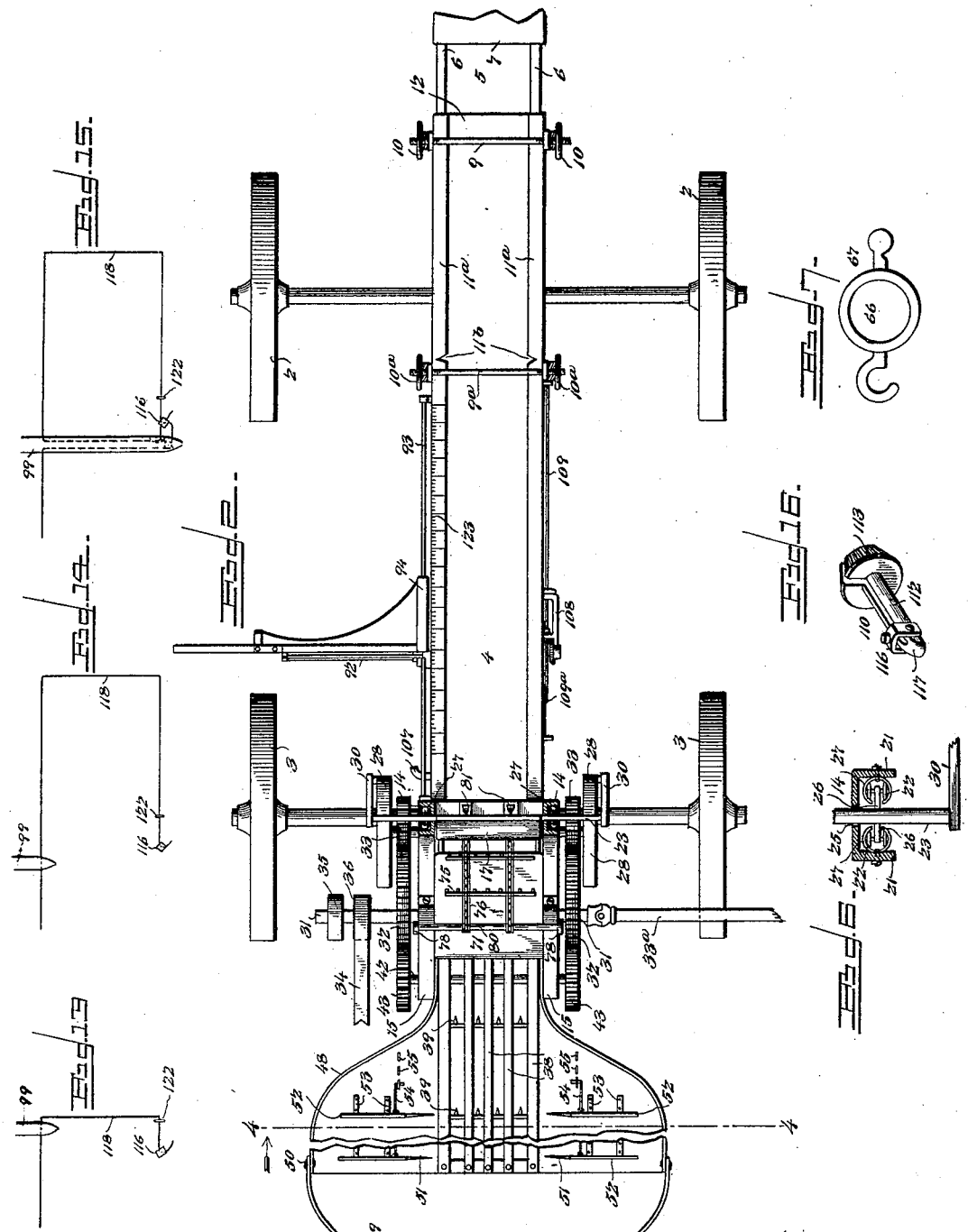
Witnesses
Charles G. Overmyer
Inventor
By C. A. Snow & Co. Attorneys,

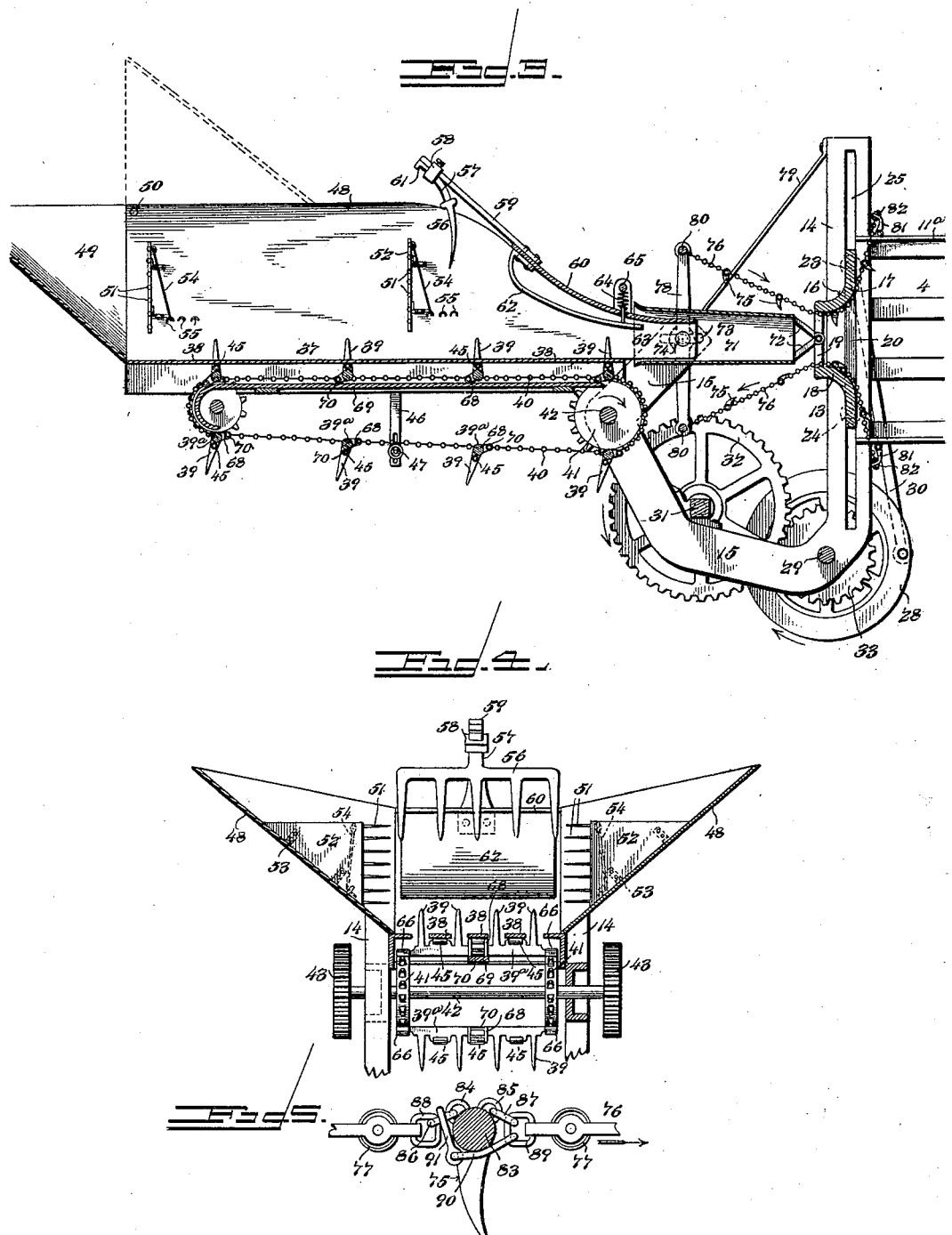

UNITED STATES PATENT OFFICE.

CHARLES G. OVERMYER, OF TOPEKA, KANSAS.

BALING-PRESS.

SPECIFICATION forming part of Letters Patent No. 619,605, dated February 14, 1899.

Application filed December 21, 1897. Serial No. 662,883. (No model.)

*To all whom it may concern:*

Be it known that I, CHARLES G. OVERMYER, a citizen of the United States, residing at Topeka, in the county of Shawnee and State of Kansas, have invented a new and useful Improvement in Baling-Presses, of which the following is a specification.

My invention relates to baling-presses, and has for its object to provide a compact and efficient construction and arrangement of parts constituting a continuous baling mechanism, and including a self-feeder having an automatic web-forming apparatus, whereby the material to be baled receives an initial compression and is trimmed to form a continuous web and is then folded in opposite directions upon itself to constitute the bale.

A further object of the invention is to provide an automatic baling mechanism which is portably mounted upon a truck and which is adapted to remain so mounted during operation.

A further important object of my invention is to provide improved tension devices capable of adjustment with facility to vary the compactness of the bales, and in connection therewith to provide simple and efficient means for tying the bales as they are completed without interrupting the operation of the mechanism.

Further objects and advantages of this invention will appear in the following description, and the novel features thereof will be particularly pointed out in the appended claims.

In the drawings, Figure 1 is a side view of a baling-machine constructed in accordance with my invention. Fig. 2 is a plan view, with the feed-table partly broken away, of the same. Fig. 3 is a partial longitudinal section of the machine, showing the feeding and web-forming mechanisms. Fig. 4 is a transverse section on the plane indicated by the line 4 4 of Fig. 2. Fig. 5 is a detail view of a portion of one of the web-feeding members to show the connection between the carrier and one of the tooth-bars. Fig. 6 is a detail transverse section of one of the frame-uprights, on the plane indicated by the line 6 6 of Fig. 1, to show the means for guiding the folder. Fig. 7 is a detail view of one of the bearing-links of the carrier-chains. Fig. 8 is a detail view of one of the bale rests or supports. Fig. 9 is a front view of the needle mechanism whereby the tie-wires are carried through the contents of the baling-chamber. Fig. 10 is a detail view, partly broken away, of one of the needles. Fig. 11 is a detail side view of the tying mechanism. Fig. 12 is a plan view of the same. Figs. 13, 14, and 15 are diagrammatic views to show the relative positions of the tier and the coöperating needle, with the run of the tie-wire between such parts at the various stages of the tying operation. Fig. 16 is a detail view of the rotary or twisting member of the tying mechanism. Fig. 17 is a detail horizontal section of the locking device for the tier.

Similar numerals of reference indicate corresponding parts in all the figures of the drawings.

The baling mechanism embodying my invention is portably mounted upon a support consisting of wheeled trucks or the equivalent thereof, as indicated in Figs. 1 and 2, the same having a draft-tongue 1 and wheels 2 and 3, of which the former are carried by a pivotal axle.

The baling-chamber 4 is arranged in a reversed position upon the support, whereby its front or feed end is toward the rear of the support, while the rear or discharge end thereof is arranged contiguous to the front of the support and carries a bale-rest 5, (indicated in operative position in Figs. 1 and 2 and shown in detail in Fig. 8,) and of which the function is to receive a completed bale after it has left the baling-chamber and support the same until manually removed. Said bale-rest consists of parallel arms 6, connected by a horizontal platform 7 and provided at their front ends with flat extensions 8, which are adapted to fit between the under side of the baling-chamber and a contiguous transverse rod which forms one of a pair of tension-bolts 9, transversely spanning the baling-chamber at its rear or discharge end and fitted with adjusting-nuts or hand-wheels 10, by the movement of which upon the tension-rods the discharge end of the baling-chamber may be more or less contracted transversely to vary the resistance offered to the movement of the bale therethrough.

In order to attain durability, I preferably construct the baling-chamber of metal, the sides consisting of longitudinal bars 11, having cross-sectionally-angular corner members 11ª and sheet or plate metal upper and lower walls 12, and the transverse contraction of the baling-chamber may be accomplished by a number of tension devices arranged at intervals. For instance, in the construction illustrated I employ intermediate tension-rods 9ª and nuts 10ª at a distance from the front end of the baling-chamber, which is equal to the longest bale which will be formed therein, and the portion of the baling-chamber in rear of these intermediate tension devices may be termed a "baling-chamber extension," at the rear end of which are located the tension devices, consisting of the members 9 and 10. This construction provides for contracting the baling-chamber extension to a greater extent than the main or body portion of the baling-chamber, and in order that this may be accomplished with facility the horizontal flanges of the corner-bars 11ª are kerfed or notched, as shown at 11ᵇ. (See Fig. 2.) In this way the bale after it has been completed and tied in the main baling-chamber may be restrained in its passage through the baling-chamber extension to retard the advance motion of the succeeding bale or that which is being formed, and thus increase the compression of the said succeeding bale without requiring the transverse contraction of the main baling-chamber.

Supported by the front end of the baling-chamber are frame-bars 13, which in the construction illustrated are substantially J-shaped, each consisting of an upright or standard 14 and a forwardly-extending arm 15, in which certain spindles and other operating parts of the mechanism are journaled, as hereinafter fully described. The uprights or standards 14 form guides for a folder 16, which is mounted for reciprocation across the mouth of the baling-chamber and preferably in a vertical plane, as illustrated, the function of this folder being to guide a web of material and fold it upon itself successively in opposite directions in order to construct a "layer-bale." The folder consists of opposite inwardly-convexed upper and lower jaws 17 and 18, of which the adjacent inner ends extend forwardly and are spaced apart to form a throat through which the bale-forming web must pass in order to enter the baling-chamber, and these jaws are connected at their extremities by bars 19 and in the plane of the guides by links 20. In the construction illustrated the guides 14 are slotted vertically or longitudinally, and being constructed of outwardly-flanged bars, of which the flanges are shown clearly in Fig. 6 at 21, I have arranged antifriction-travelers 22 in the channels formed thereby. Transverse upper and lower laterally-extending pins 23 and 24 project through the slots 25 of the guides and carry spindles 26, upon which these travelers, consisting, preferably, of rollers, are mounted, and cross-sectionally-semitubular ways 27, arranged in said channels of the standards or uprights 14, form paths in which the travelers operate.

The means illustrated in the drawings for communicating reciprocatory motion to the folder include a crank-wheel 28, carried by a spindle 29, suitably mounted in the arms 15 of the frame-bars 13, and pitmen 30, connecting said crank wheels or disks with the upper pins 23. A driving-shaft 31, also mounted upon said arms 15, is provided with a driving or master gear 32, which meshes with a pinion 33 on the spindle 29, said driving-shaft receiving motion either from a horse-power, (not shown,) through tumbling-rods 33ª, or from a mechanical source of power through a belt 34, which is adapted to traverse fast and loose pulleys 35 and 36 on an extension of the shaft 31. It will be understood that any suitable means may be employed for operating the shaft 31, and in practice I have found it convenient to operate the same from the thresher by utilizing the belt connection above indicated.

The feeding and web-forming mechanisms, which constitute important elements of the machine embodying my invention, include a feed-table 37, of longitudinally-slotted construction, the same as illustrated consisting of parallel longitudinally-disposed slats 38, in the openings or slots between which operate the teeth of feed-forks 39, actuated by an endless carrier consisting, in the construction illustrated, of chains 40. This carrier traverses operating chain-wheels or sprockets 41, of which the spindle 42 carries gears 43, meshing with the driving or master gears 32, and also traverses idle chain or sprocket wheels 44, arranged near the front end of the feed-table. Each feed-fork 39 consists of a transversely-disposed bar connecting the chains 40 and provided between the planes of its teeth with antifriction-rollers 45 to traverse the under surfaces of the slats 38 constituting the feed-table, and in order to maintain the chains 40 in a taut condition I employ suitable chain-tighteners consisting of slotted brackets 46 and rollers 47, mounted thereon, as indicated in Fig. 3.

The feed-table in the construction illustrated is provided with inclined side walls 48, and at the front end of the table is arranged a movable chute 49, adapted, as indicated in dotted lines in Fig. 3, to be folded to a position above the feed-table when not in use, for which purpose said chute is pivoted, as at 50, to the side walls of the feed-table. Also carried by said side walls are side detaining or trimming rakes 51, supported by leaves or plates 52, hinged, as at 53, to the walls 48 and secured in the desired position with relation to said walls by means of fastening-rods 54, hooked at their free ends to engage staples 55. The function of these side detaining or trimming rakes is to remove the loose material at the sides of the mass of material which is being carried forward by the feeder, consisting of the forks 39 and the chains by which they are supported. In addition to these side detaining or trimming rakes, however, I employ a top detaining or trimming rake 56, located transversely with relation to and above the feed-table, to detain loose portions of material passing thereunder, while offering no obstacle to the movement of the more solid body portion or mass which is carried forward by the forks 39. This top detaining or trimming rake is also adjustable with relation to the feed-table by means of a stem or tang 57, which is secured by a clamp 58 to a supporting-arm 59, projecting forwardly from a partial top wall or cover 60, which connects the side walls 48 near the rear end of the feed-table. The shank or tang 57 is preferably provided at its extremity with a stop 61, and by the adjustment of said shank in the clamp and also by the adjustment of the clamp upon the supporting-arm 59, which inclines forwardly toward its extremity, the teeth of the detaining-rake 56 may be arranged at any desired distance from the plane of the feed-table and at any desired inclination with relation thereto.

Also supported by the partial cover or top wall 60 of the feed-table is a pressure-plate 62, inclining downwardly and rearwardly toward its free end and having a convexed under surface leading to the reduced or discharge end of the feed-table. The function of this pressure-plate is to compress the mass of material as it is moved upon the feed-table by the feeding mechanism and form it into a web to pass through said reduced or outlet passage 63 of the feed-table, the pressure-plate being yieldingly held at the desired depression by means of springs 64, attached to a transverse rod 65. Also the side walls of the feed-table incline inwardly or toward each other as they approach the outlet 63 to cause lateral compression of the web.

As the web is advanced by means of the endless feeder and is transversely or vertically and laterally compressed to pass through the reduced outlet 63 it is desirable to withdraw the teeth of the forks 39 therefrom without disturbing the material, and hence I preferably construct the feeder with pivotal forks, of which the bars 39ª are provided with terminal trunnions mounted in bearings 66 in special bearing-links 67 of the carrier-chains 40, and I also provide said forks with trip-fingers 68, which are adapted to traverse a guide-plate 69 during the time that the forks are in operative position. This guide plate or bar preferably has its initial point approximately under the spindle of the idle chain-wheels 44, and thence extends upwardly to a point above said spindle and then rearwardly parallel with the feed-table to a point approximately in the vertical plane of the axis of the chain-wheels 41. The termination of the guide-plate 69 above the axis of the chain-wheels 41 allows the trip-fingers 68 to drop, and thus permits the forks to turn in their bearings and draw the teeth thereof out of the web in the direction of the lengths of said teeth. The trip-fingers are preferably provided at their extremities with antifriction-rolls 70 to traverse the guide-plate 69.

The connection between the stationary reduced outlet 63 of the feed-table and the throat of the reciprocatory folder 16 consists of a conveyer 71, having open ends respectively in communication with said outlet and throat and consisting of side, top, and bottom walls to maintain the web in the proper shape as it traverses the same. In the construction illustrated this conveyer is of a size sufficient to receive the contiguous portion of the outlet 63 and to remain in a position inclosing the same while oscillating in a vertical plane synchronously with the folder, and at its rear end the conveyer is pivotally connected to the folder, as by means of brackets 72, mounted upon the connecting-bars 19 of the folder. This necessitates a sliding connection between the conveyer and the outlet 63, which is provided by slots 73 in the former, fitted upon pins 74 on the latter, said pins also being extended to engage the arms 15 near their extremities, whereby the frame-bars support the rear end of the feed-table.

This being the construction of the feeding and web-forming devices of the baling-press embodying my invention, it will be seen that in operation the folder is reciprocated across or transversely of the mouth of the baling-chamber, (preferably in a vertical plane,) while the material to be baled, whether hay, cotton, or other substance, is carried forward continuously by the feeder having the feeding-forks, which are brought into operative position at the front end of their path and are allowed to fold when they approach the rear end of their path, is advanced toward the contracted outlet 63 of the feed-table, and is compressed transversely (both laterally and vertically) to form a compact continuous web, the radiating or loose portions of the mass both at its sides and top being removed by means of the side and top detaining-rakes. The pressure-plate 62 exerts a yielding downward pressure upon the web, and hence compresses the latter vertically to a thickness which is less than the vertical height of the outlet 63 to avoid stoppage in the outlet. The web then passes through the conveyer and the throat of the folder and by the reciprocatory movement of the latter is doubled upon itself alternately in opposite directions to form folds equal in length with the vertical dimensions of the baling-chamber. It is desirable, however, to provide for drawing the web from the outlet and through the conveyer and the throat of the folder in order to insure a uniform folding of the web, and therefore I employ drag-forks 75, flexibly connected, as by means of carrier-chains 76, provided with antifriction-rollers 77 to traverse the inner convexed surfaces of the jaws 17 and 18, the rear extremities of said carriers being permanently fixed at opposite points adjacent to the mouth of the baling-chamber and at their rear ends to opposite extremities of equalizing-levers 78, which may be fulcrumed, preferably at their centers, concentrically with or upon the pins 74, inclined braces 79 extending rearwardly and upwardly from said pins to the upper extremities of the uprights or standards 14. Said equalizing-levers may be connected by transverse rods 80 for the attachment of the carriers 76, and the fixed attachment of the rear ends of the carriers may be accomplished by means of brackets 81 and tension devices, consisting of oppositely-disposed nuts 82, engaging said brackets.

As the folder reciprocates by the means above indicated, the drag-feeders respectively move inwardly and outwardly with relation to the mouth of said folder, the equalizing-levers serving to maintain an approximately equal strain upon the carriers 76 in all positions of said feeders. For instance, as the folder descends the upper jaw bears downwardly upon the upper carrier 76 and causes it to move inwardly with relation to the mouth of the folder, while the slacking of the lower carrier causes the latter to move outwardly with relation to the mouth, as indicated by the arrows in Fig. 3, whereas during the opposite movement of the folder the relative directions of movement of the carriers are reversed to cause the lower drag-forks to move inwardly while the upper forks move outwardly with relation to the mouth. It is desirable, however, in order to prevent imparting an outward impulse to the web of the material by those drag-forks which are moving outwardly to provide means for folding the drag-forks during their movement in one direction and extending the same during their movement in the other direction, or, in other words, to fold said forks when not in operation and extend them when they are moving in an operative direction. I accomplish this by providing the drag-forks with spindles 83, having front and rear attaching devices, such as eyes 84 and 85, respectively connected by loose links 86 and 87 with draft-links 88 and 89, said draft-links being in turn connected with the carrier-links at opposite sides of the plane of the fork. These fork-spindles 83 are held in operative position with relation to the line of draft of the carrier by means of equalizing-links 90 and 91, the former of which is connected with the draft-link 89 and the latter of which is carried by the front end of the link 90 and is engaged normally with the connecting-link 86, but which has a movable or sliding connection therewith. When the carrier is strained, as during its inward feeding movement, in the direction indicated by the arrow in Fig. 5, the connecting-link 87, drawing upon the attaching-eye 85, turns the spindle of the fork in its bearings formed by the connected equalizing-links 90 and 91 to the operative or approximately perpendicular position indicated in said Fig. 5, whereas a strain in the opposite direction during the outward movement of the carrier and applied by the equalizing-lever 78 causes the application of strain to the eye 84 through the link 86, and hence tilts or folds the fork until said eye 84 passes into or through the equalizing-link 91. Thus in operation those drag-forks which are moving inwardly or toward the baling-chamber are held with their teeth in a perpendicular or operative position to engage the web and carry it positively through the mouth of the folder and to a point near that wall of the baling-chamber from which the folder is moving, while the forks of the other carrier as they reach the convex surface of the adjacent jaw of the folder are caused to tilt and incline inwardly or toward the baling-chamber, and thus afford no obstacle to the inward movement of the web, which is caused by the operative drag-forks on the other member of the drag-feeder. Thus it will be seen that in connection with the web-forming devices, including the continuously-operated feed-forks 39, I employ a drag-feeder consisting of two members mounted for reciprocatory movement in opposite directions and connected by an equalizing device consisting of the lever 78, whereby the opposite reciprocatory movement of said members is caused by the reciprocation of the folder in a direction transverse to the paths of the drag-feeder members. This construction and arrangement of parts insures a continuous web forming and feeding operation, whereby the material is arranged compactly in layers within the baling-chamber, the necessary pressure being afforded by the convexed inner surfaces of the folder-jaws as they traverse the surfaces of the layers, in connection with suitable means, as hereinbefore described, for retarding the movement of the bale toward the outlet or discharge end of the chamber.

In connection with the above-described mechanisms I employ bale-tying devices, whereby the tie of wire or other material may be extended at the proper intervals through the contents of the baling-chamber to form bands, of which the extremities are intertwisted or otherwise interlocked to preserve the bale in the proper shape. That construction of mechanism which I prefer embodies a carriage 92, mounted upon guide-rods 93, which are extended longitudinally of the baling-chamber, as shown clearly in Fig. 2, said carriage having slides 94, which are fitted upon the guide-rods. The carriage, as illustrated in the drawings, consists of a Y-frame carrying a guide-frame, which includes parallel guide-pins 95, terminally connected by inner and outer bars 96 and 97. The inner bar 96 is provided with guide-openings 98, through which extend the needles 99 of a needle-frame, said needles being connected for simultaneous movement by a bar 100, of which the extremities are mounted upon the guide-pins 95.

Connected with the needle-frame is a rack-bar 101, with which meshes a segment 102, provided with an operating-lever 103, and it will be seen that by moving this lever in the direction indicated by the arrow in Fig. 9 the needle-frame will be advanced in the direction also indicated by the arrows to extend through the contents of the baling-chamber. This movement of the needles is designed to carry the tie-wire or other material through the contents of the baling-chamber, and hence the needles near their points are provided with eyes 104, with which communicate longitudinal grooves 105.

The wire-spools (indicated in dotted lines at 106 in Fig. 1) are arranged in a suitable receptacle under the baling-chamber or at any other convenient point, and leading from the receptacle are guide-tubes 107 to guide the wire to the several needles carried by the needle-frame. The wires extend from the guides 107 through the eyes of the needles, and it is obvious that when the needle-frame is advanced loops of the wires will be carried through the baling-chamber to points within reach of an operator located at the opposite side of said chamber.

The tiers 108 are mounted upon the opposite side of the baling-chamber from the needle-frame upon longitudinal guide-bars 109 for movement parallel with the chamber, and each tier includes a twister 110, mounted in a suitable bearing in the tier-frame 111 and consisting of a grooved spindle 112, upon one end of which is arranged a radially-kerfed bevel-pinion 113, with which meshes a driving-gear 114, having a crank-handle 115. The slotted twister-spindle 110 is arranged parallel with the baling-chamber, and upon its extremity is mounted a cam-clamp 116, cooperating with a cam-face 117 on the spindle and adapted to engage and hold the loose end of the tie-wire 118, as clearly shown in Figs. 11 and 12. The tier is also provided with a wire-cutter having a fixed jaw 119 and a movable or pivotal jaw 120, the latter being extended to form a handle 121, and contiguous to the cutter, and preferably carried by the fixed jaw thereof, is a retaining-hook 122.

Assuming that one end of the tie-wire has been carried through the baling-chamber either by the tying of a previously-formed bale or preparatory to the baling operation, the tier being located near the front end of the guide upon which it is mounted, said wire is extended under the retaining-hook 122, and thence is extended forwardly to and is engaged by the clamp 116 by passing the end of the wire from the upper side between the cross-bar and the clamp and the cam-surface 117, whereby strain upon the tie-wire will only add to the firmness with which it is held by the clamp. This arrangement of parts is clearly shown in diagram in Fig. 13. As the baling operation proceeds the portion of the tie-wire which extends transversely across the baling-chamber is carried toward the discharge end of the baling-chamber, as indicated diagrammatically in Fig. 14, the tier retaining its position by engagement with a notch 109$^a$ in bar 109, the front guide of the tier-frame having a tooth 109$^b$ to fit in the said notch 109$^a$. When a sufficient quantity of material has been pressed in the baling-chamber to form a bale of the desired size, the needle-frame is adjusted accurately with relation to the transverse portion of the tie-wire or at the desired distance therefrom to determine the required length of bale (such distance being indicated by the gage 123, formed upon one of the corner-bars 11$^a$ of the baling-chamber) and the needle-frame is advanced to carry loops of the tie-wires through the baling-chamber. Each needle is provided in its rear side and intersecting the contiguous groove 105 with a kerf or notch 124 to enable the operator located on the tier side of the baling-chamber to grasp the tie-wire. The loop of the tie-wire is then drawn rearwardly by the operator, and one side of the loop is extended through the radial kerf of the pinion 113 and is seated in the longitudinal groove of the twister-spindle and then being still further carried to the rear is passed into the notches of the cutter-jaws 119 and 120. The frame of the tier is then released to follow the bale (during the further operation) by disengagement from the notch 109$^a$, and the crank 115 is turned to rotate the twister-spindle, and thus twist the free end of the tie-wire with that portion which lies between the twister-spindle and the cutter-jaws. The twisting operation is immediately followed by the operation of the movable cutter-jaw to sever the tie from the body portion of the wire, and after disengaging the tie from the tier the loose end of the wire is carried forwardly under the hook 122, is engaged with the clamp 116, the needle-frame is withdrawn from its position across the baling-chamber, and the tier is returned to its initial position near the front end of the baling-chamber, as indicated diagrammatically in Fig. 13. The parts are then in position for the formation of the succeeding bale. It will be understood, however, that the operation of baling is not interrupted by the tying of the bales. The needle-frame is free to move longitudinally of the baling-chamber to enable the operator to extend the needles through the chamber at such points as to form the desired lengths of bales with relation to the tier or the transversely-extended portion of the tie-wire which is in advance of the bale to be tied, and hence during the tying of one bale the formation of the succeeding bale may be proceeding without interfering with the said tying operation. When a completed tie has been disconnected from the body portion of the tie-wire and the needle-frame has been withdrawn from the baling-chamber, it may be run toward the front of the chamber to the desired point and again advanced if the succeeding bale has reached the required size.

In the drawings I have shown the needle-frame provided with three needles, thus requiring obviously an equal number of tiers; but it will be understood that any desired number of needles and tiers may be employed and that various other changes in the form, proportion, and the minor details of construction may be resorted to without departing from the spirit or sacrificing any of the advantages of this invention. It will also be understood that suitable means for covering the operating parts, such as the gearing, may be employed to protect the same from falling particles of the material which is being baled, and thus maintain the mechanism in operative condition; but I have deemed it unnecessary, in connection with the disclosure of my invention, to illustrate such means in the drawings.

Having described my invention, what I claim is—

1. A baling-press having a baling-chamber, a reciprocatory folder mounted to traverse the mouth of the baling-chamber transversely, and having a throat to receive a web of material to be baled, inwardly and outwardly reciprocating feeders extending through the throat, and means for reciprocating the folder, substantially as specified.

2. A baling-press having a baling-chamber, a reciprocatory folder mounted to traverse the mouth of the baling-chamber transversely, and having a throat to receive a web of material to be baled, feeding devices having oppositely-located members provided with drag-forks, and actuated to traverse the mouth of the folder alternately in opposite directions, and means for reciprocating the folder, substantially as specified.

3. A baling-press having a baling-chamber, a reciprocatory folder mounted to traverse the mouth of the baling-chamber transversely, and having a throat to receive a web of material to be baled, feeding devices including flexibly-connected drag-forks extending through the throat and actuated to traverse the same alternately in opposite directions, and means for reciprocating the folder, substantially as specified.

4. A baling-press having a baling-chamber, a reciprocatory folder mounted to traverse the mouth of the baling-chamber transversely, and having a throat to receive a web of material to be baled, series of drag-forks connected by chains, attached at one end to a fixed object and yieldingly held at the other end for movement alternately in the opposite directions into and out of said throat, and means for reciprocating the folder, substantially as specified.

5. A baling-press having a baling-chamber, a reciprocatory folder mounted to traverse the mouth of the baling-chamber transversely, and having a throat to receive a web of material to be baled, drag-forks connected in series by chains fixed at one end, an equalizing-lever connecting the chains at the other end, and means for reciprocating the folder, substantially as specified.

6. A baling-press having a baling-chamber, a reciprocatory folder mounted to traverse the mouth of the baling-chamber transversely, and having spaced inwardly-convexed jaws forming a throat to receive a web of material to be baled, inwardly and outwardly reciprocating feeders extending through the throat, and means for reciprocating the folder, substantially as specified.

7. A baling-press having a baling-chamber, a reciprocatory folder mounted to traverse the mouth of the baling-chamber transversely, and having spaced inwardly-convexed jaws forming a throat to receive a web of material to be baled, feeding devices having oppositely-located members provided with drag-forks, and actuated to traverse the mouth of the folder alternately in opposite directions, and means for reciprocating the folder, substantially as specified.

8. A baling-press having a baling-chamber, a reciprocatory folder mounted to traverse the mouth of the baling-chamber transversely, and having spaced inwardly-convexed jaws forming a throat to receive a web of material to be baled, feeding devices including flexibly-connected drag-forks extending through the throat and actuated to traverse the same alternately in opposite directions, and means for reciprocating the folder, substantially as specified.

9. A baling-press having a baling-chamber, a reciprocatory folder mounted to traverse the mouth of the baling-chamber transversely, and having spaced inwardly-convexed jaws forming a throat to receive a web of material to be baled, flexibly-connected drag-forks traversing said jaws to move in opposite directions thereover during the reciprocation of the folder, and means for operating the folder, substantially as specified.

10. A baling-press having a baling-chamber, a reciprocatory folder mounted to traverse the mouth of the baling-chamber transversely, and having spaced inwardly-convexed jaws forming a throat to receive a web of material to be baled, series of drag-forks connected by chains, attached at one end to a fixed object, and yieldingly held at the other end for movement alternately in opposite directions into and out of said throat, and means for reciprocating the folder, substantially as specified.

11. A baling-press having a baling-chamber, a reciprocatory folder mounted to traverse the mouth of the baling-chamber transversely, and having spaced inwardly-convexed jaws forming a throat to receive a web of material to be baled, drag-forks connected in series by chains to traverse the jaws of the folder, said chains being fixed at one end, an equalizing-lever connecting the chains at the other end, and means for reciprocating the folder, substantially as specified.

12. A baling-press having a baling-chamber, a reciprocatory folder mounted to traverse the mouth of the baling-chamber transversely, and having spaced inwardly-convexed jaws forming a throat to receive a web of material to be baled, feeders having opposite series of drag-forks and flexible connections between the same, extending through the throat and arranged at intermediate points to traverse said jaws, the connections at one end being fixed, an equalizing-lever between the other ends of the connections, and means for reciprocating the folder, substantially as specified.

13. A baling-press having a baling-chamber, a reciprocatory folder mounted to traverse the mouth of the baling-chamber transversely, and having spaced inwardly-convexed jaws forming a throat to receive a web of material to be baled, flexibly-connected drag-forks extending through the throat and arranged to traverse said jaws alternately in opposite directions, the drag-forks being foldably mounted upon said connections, and means for reciprocating the folder, substantially as specified.

14. A baling-press having a baling-chamber, a reciprocatory folder mounted to traverse the mouth of the baling-chamber and having a feed-throat to receive a web of material to be baled, a series of drag-forks extending through said throat for reciprocation alternately in opposite directions, and means for alternately folding and extending the drag-forks when moved in opposite directions, substantially as specified.

15. A baling-press having a feed-throat, series of folding drag-forks extending through said throat and traversing the walls thereof, operating devices for reciprocating said series of drag-forks alternately in opposite directions and means for alternately folding and extending the forks when moving in opposite directions, substantially as specified.

16. A baling-press having a feed-throat, oppositely-located series of connected drag-forks extending through the feed-throat for reciprocatory movement, and operating devices for moving the opposite series of drag-forks simultaneously in opposite directions, and means for alternately folding and extending the forks when moving in opposite directions, substantially as specified.

17. A baling-press having a feed-throat, flexible feeding devices extending through the feed-throat and consisting of opposite series of drag-forks, and chains connecting the forks in each series, the forks being pivotally mounted upon the chains to fold during the movement thereof in one direction, operating devices for moving the chains alternately in opposite directions through the feed-throat and means for alternately folding and extending the forks when moving in opposite directions, substantially as specified.

18. A baling-press having a feed-throat, a reciprocatory feeding device having a flexible carrier extending through the feed-throat and drag-forks supported by the carrier, means for applying a strain in opposite directions to the carrier, and connections between the carrier and the drag-forks whereby the latter are alternately extended and folded as the direction of strain upon the carrier varies, substantially as specified.

19. A baling-press having a feed-throat, a feeding device having a flexible carrier extending through the feed-throat, and drag-forks mounted upon the carrier, means for applying a strain in opposite directions to the carrier, and connections between the carrier and the drag-forks including connecting-links extending from each drag-fork in opposite directions to the carrier, substantially as specified.

20. A baling-press having a feed-throat, a feeding device extending through said feed-throat for reciprocation, and including a flexible carrier and drag-forks having spindle portions mounted upon the carrier, means for straining the carrier alternately in opposite directions, and connections between the carrier and each drag-fork including eyes 84, 85, and connecting-links 86, 87 extending in opposite directions from said eyes to the carrier, substantially as specified.

21. A baling-press having a feed-throat, a feeding device extending through the feed-throat and having a flexible carrier and drag-forks mounted upon the carrier and having spindle portions, means for straining the carrier alternately in opposite directions, and connections between the carrier and each drag-fork including connecting-links extending in opposite directions from the drag-fork to the carrier, and connected equalizing-links attached at one end to the carrier and slidably mounted at the other end upon the remote connecting-link, substantially as specified.

22. A baling-press having a baling-chamber, and a reciprocatory folder mounted to traverse the mouth of the baling-chamber transversely, in combination with stationary web-forming devices, means for transversely compressing material as it passes toward the outlet of the web-forming devices, and an oscillatory conveyer connecting the outlet of the web-forming devices with said folder, substantially as specified.

23. A baling-press having a baling-chamber, a reciprocatory folder mounted to traverse the mouth of the baling-chamber transversely, and feeding devices for conveying a web of material through the folder into the baling-chamber, combined with web-forming devices including a stationary outlet, and a conveyer slidably connected with said outlet and pivotally connected with the folder in alinement with the throat thereof, substantially as specified.

24. A baling-press having a baling-chamber, a reciprocatory folder mounted to traverse the mouth of the baling-chamber transversely, combined with web-forming devices including a feed-table having a reduced outlet, means for advancing material toward the discharge end of the feed-table, and means for transversely compressing the material as it approaches said outlet, substantially as specified.

25. In a baling-press, the combination with a baling-chamber and means for advancing and folding a web of material, of web-forming devices including a feed-table having a reduced outlet, a yielding pressure-plate between which and the floor of the feed-table the material is adapted to pass, and endless feeding devices for conveying the material toward said reduced outlet of the feed-table, substantially as specified.

26. In a baling-press, the combination with a baling-chamber and means for advancing and folding a web of material, of web-forming devices including a feed-table having a reduced outlet, feeding devices for conveying material upon said feed-table toward the reduced outlet thereof, and detaining or trimming rakes arranged adjacent to the path of material traversing the table, to remove surplus material, substantially as specified.

27. In a baling-press, the combination with a baling-chamber and means for advancing and folding a web of material, of web-forming devices including a feed-table having a reduced outlet, compressing devices for transversely reducing the material as it approaches said outlet, feeding devices for advancing material upon the feed-table toward the outlet, and detaining or trimming rakes located contiguous to the path of material traversing the feed-table, substantially as specified.

28. In a baling-press, the combination with a baling-chamber and means for advancing and folding a web of material, of web-forming devices including a feed-table having a reduced outlet, means for transversely compressing the material as it approaches the outlet, feeding devices for advancing the material upon the feed-table toward its outlet, and side and top detaining or trimming rakes for removing surplus material as it approaches the outlet, substantially as specified.

29. In a baling-press, the combination with a baling-chamber and means for advancing and folding a web of material, of web-forming devices including a feed-table having a reduced outlet, means for advancing material upon the feed-table toward its outlet, and detaining or trimming devices including a rake having a shank or tang, a supporting-arm, and a clamp for securing said shank or tang at the desired adjustment with relation to the supporting-arm, substantially as specified.

30. In a baling-press, the combination with a baling-chamber and means for advancing and folding a web of material, of web-forming devices including a feed-table having a reduced outlet, means for advancing material upon the feed-table toward its outlet, and detaining or trimming devices including a rake having a hinged carrying-plate, a securing-rod connected to said plate, and spaced keepers for engagement by a hooked extremity of the securing-rod, substantially as specified.

31. In a baling-press, the combination with a baling-chamber and means for advancing and folding a web of material, of web-forming devices including a feed-table having a reduced outlet and inclined side walls, means for advancing material upon the table toward its outlet, and detaining or trimming devices including side rakes having carrying-plates hingedly mounted upon said inclined side walls of the feed-table, and means for securing said rakes at the desired inclination, substantially as specified.

32. In a baling-press, the combination with a baling-chamber and means for advancing and folding a web of material, of web-forming devices including a longitudinally-slotted feed-table having a reduced outlet, means for transversely compressing material as it approaches said outlet, and means for advancing material toward said outlet, the same including an endless carrier, feed-forks foldably mounted upon said carrier, means for holding said forks in their operative positions throughout a portion of the path traversed thereby, and operating devices for the carrier, substantially as specified.

33. In a baling-press, the combination with a baling-chamber and means for advancing and folding a web of material, of web-forming devices including a longitudinally-slotted feed-table having a reduced outlet, means for transversely compressing material as it approaches said outlet, the same including an endless carrier and operating devices therefor, feed-forks pivotally mounted upon said carrier and having trip-fingers, and a guide-plate arranged in the path of said trip-fingers for maintaining the feed-forks in their operative positions throughout a portion of the path traversed thereby, substantially as specified.

34. In a baling-press, the combination with a baling-chamber, of frame-bars secured to the baling-chamber near its mouth and including uprights or standards, and forwardly-extending arms, a reciprocatory folder mounted upon said uprights or standards, web-forming devices including a feed-table and an endless feeding device coöperating with the feed-table, and operating devices for said folder and feeding device mounted upon the forwardly-extending arms of said frame-bars, substantially as specified.

35. In a baling-press, the combination with a baling-chamber, of slotted uprights or supports, a reciprocatory folder having oppositely-positioned jaws mounted to reciprocate between said uprights or standards and having guide-pins mounted in the slots of the uprights or standards, antifriction-bearing devices for said pins, and means for communicating reciprocatory movement to the folder, substantially as specified.

36. In a baling-press, the combination with a baling-chamber, of slotted uprights or standards, pairs of parallel facing semitubular guides supported by the uprights, a reciprocatory folder mounted between the uprights and having pins extending laterally through the slots thereof, antifriction-rollers carried by said pins and operating in said tubular guides, and means for communicating reciprocatory movement to the folder, substantially as specified.

37. In a baling-press, the combination with a baling-chamber, frame-bars 15 arranged at the front end of the baling-chamber and provided at their lower ends with forwardly and upwardly extending members, a feed-table supported by said frame-bars and extending forwardly from the baling-chamber, and baling devices, of baling-press-supporting devices consisting of a wheeled truck having its front and rear wheels arranged under the baling-press respectively at its rear and front ends, whereby said feed-table extends beyond the rear truck-wheels, and draft devices connected with the front end of the truck, substantially as specified.

38. In a baling-press, the combination with a baling-chamber and baling devices, of bale-binding devices including a tier mounted upon the baling-chamber for movement parallel therewith and proportionate to the movement of material within the chamber, and means for extending a tie-wire transversely across the baling-chamber, substantially as specified.

39. In a baling-press, the combination with a baling-chamber and baling devices, of bale-binding devices including a tier mounted for movement parallel with the baling-chamber and proportionate to the movement of material within the chamber, and provided with means for engaging the extremity of a tie-wire, and a needle-supporting carriage mounted upon the opposite side wall of the baling-chamber, and provided with means for advancing wire-carrying needles transversely through the baling-chamber, substantially as specified.

40. In a baling-press, the combination with a baling-chamber and baling devices, of bale-binding mechanism having its members including needles and tiers, mounted upon the baling-chamber for movement parallel therewith and proportionate to the advance of material into the baling-chamber, substantially as specified.

41. In a baling-press, the combination of a baling-chamber and baling devices, said baling-chamber being provided with a longitudinally-disposed scale, and bale-binding mechanism including a tier, and a reciprocatory needle-frame mounted upon the baling-chamber adjacent to said scale for longitudinal movement, whereby the interval between the transverse portion of a tie-wire and the needle-frame may be regulated by the scale to form bales of the desired length, said needle-frame carrying reciprocatory needles, substantially as specified.

42. In a baling-press, the combination with a baling-chamber and baling devices, of bale-binding mechanism including tiers, a reciprocatory needle-frame having needles, and mounted upon the baling-chamber for longitudinal movement to arrange the needles opposite the desired points thereof, and wire-feeding devices including housed spools, and tubular wire-guides for conveying the wire from the spools, substantially as specified.

43. In a baling-press, the combination with a baling-chamber and baling devices, of bale-binding mechanism including tiers, a needle-frame having needles and mounted upon the baling-chamber for movement longitudinally thereof, and stationary wire-guides carried by the baling-chamber to convey tie-wire to the needles, substantially as specified.

44. In a baling-press, the combination with a baling-chamber and baling devices, of bale-binding devices including a tier, a carriage mounted upon guides parallel with the baling-chamber and carrying guide-pins, a needle-frame mounted upon said guide-pins and having wire-engaging needles, a rack attached to the needle-frame, and a toothed segment mounted upon the carriage and meshing with the rack-bar, said toothed segment being provided with an operating-lever, substantially as specified.

45. In a baling-press, the combination with a baling-chamber and baling devices, of bale-binding devices including a needle, a tier provided with a wire-twister consisting of a spindle having a laterally-open groove and a clamp carried by said spindle, for respectively receiving and engaging a wire at an intermediate point and engaging the same at its extremity, and means for operating the twister, substantially as specified.

46. In a baling-press, the combination with a baling-chamber and baling devices, of a wire-engaging needle, and twisting mechanism comprising a rotary twister having a grooved spindle and a clamp mounted upon the spindle for respectively engaging a wire at an intermediate point and at its extremity, and a retaining-hook for engaging the wire end adjacent to said clamp, substantially as specified.

47. In a baling-press, the combination with a baling-chamber and baling devices, of bale-binding devices including a needle, and a twisting mechanism comprising a twister having a grooved spindle and a clamp carried by the spindle, for respectively engaging a tie-wire at an intermediate point and at its extremity, a wire-cutter, and means for communicating motion to the twister, substantially as specified.

48. In a baling-press, the combination with a baling-chamber and baling devices, of bale-binding devices including a reciprocable needle-bar mounted adjacent to one wall of the baling-chamber, and having needles provided with terminal eyes to form running guides for the tie-wires, and tiers mounted adjacent to the opposite wall of the baling-chamber for movement parallel therewith, and each having a twister provided with means for engaging a loop of the tie-wire at an intermediate point, and also provided with means for engaging the extremity of the tie-wire, a retaining-hook, and a wire-cutter, substantially as specified.

49. In a baling-press, a baling-chamber having slotted side walls and cross-sectionally-angular corner-bars of which the horizontal flanges are notched or kerfed at intermediate points, and tension devices connecting the side walls of the baling-chamber respectively at opposite sides of the transverse plane of said kerfed or notched portions of the corner-bars, substantially as specified.

50. In a baling-press, the combination with a portable supporting-truck, of a baling-chamber mounted thereon and provided at its front end with frame-bars and at its rear end and parallel with its floor, with a transverse rod, baling and feeding devices carried by said frame-bars at the front end of the baling-chamber, and a bale-rest having side arms provided with reduced extensions removably fitted between said transverse rod and the floor of the baling-chamber at its rear end, substantially as specified.

CHARLES G. OVERMYER.

Witnesses:
R. E. SEMPLE,
F. J. ELY.